(12) United States Patent
Nirmel

(10) Patent No.: US 9,669,556 B2
(45) Date of Patent: Jun. 6, 2017

(54) TOOL FOR CUTTING TOUGH ELEMENTS

(76) Inventor: Chittaranjan Narandas Nirmel, Warfordsburg, PA (US)

( * ) Notice: Subject to any disclaimer, the term of this patent is extended or adjusted under 35 U.S.C. 154(b) by 1533 days.

(21) Appl. No.: 12/456,260

(22) Filed: Jun. 15, 2009

(65) Prior Publication Data

US 2010/0313431 A1 Dec. 16, 2010

(51) Int. Cl.
*A01D 1/00* (2006.01)
*B26B 27/00* (2006.01)
*A01G 3/00* (2006.01)

(52) U.S. Cl.
CPC ............... *B26B 27/00* (2013.01); *A01G 3/00* (2013.01); *Y10T 83/04* (2015.04)

(58) Field of Classification Search
CPC ............ B26B 27/00; A01G 3/00; Y10T 83/04
USPC ........... 30/278, 508, 371, 380, 286, 138, 49; 172/378, 377, 380; 144/193, 34.1, 24.12
See application file for complete search history.

(56) References Cited

U.S. PATENT DOCUMENTS

| | | | | |
|---|---|---|---|---|
| 1,204,323 A * | 11/1916 | Sohn | | 172/378 |
| 1,512,181 A * | 10/1924 | Knechtel | | 144/34.2 |
| 1,683,395 A * | 9/1928 | Oakland | | 172/360 |
| 1,848,651 A * | 3/1932 | Peeler et al. | | 172/375 |
| 2,625,871 A * | 1/1953 | Miller | | 172/13 |
| 4,250,968 A * | 2/1981 | Fox | | 172/60 |
| 4,334,583 A * | 6/1982 | Parker | | 172/375 |
| 4,761,855 A * | 8/1988 | Peters | | 452/161 |
| 4,934,464 A * | 6/1990 | Shields | | 172/19 |
| 5,560,434 A * | 10/1996 | Janik | | 172/378 |
| 5,964,299 A * | 10/1999 | Padgett | | 172/378 |
| D495,568 S * | 9/2004 | Register | | D8/10 |
| 7,322,108 B2 * | 1/2008 | Caldwell | | 30/49 |
| 7,681,317 B2 * | 3/2010 | Fagan | | 30/167 |

* cited by examiner

*Primary Examiner* — Omar Flores Sanchez
(74) *Attorney, Agent, or Firm* — Chittaranjan N. Nirmel

(57) ABSTRACT

A small hand-held tool has a concavely open, center-symmetric, cutting edge at a forward end. To cut an elongate object such as a woody weed stem in a garden, the cutting edge is forcibly applied, preferably horizontally, at about or just below ground level in a forward direction simultaneously with an alternating side-to-side horizontal force to turn the tool and the cutting edge in a to-and-fro motion around the elongate object being cut. Forwardly inclined, center-symmetrically disposed saw teeth on the cutting edge will quickly cut the woody stem below ground so that no stubs are left sticking out of the ground to later trip the unwary. If the tool is fitted instead with a cutting blade provided with, for example, tungsten carbide-tipped teeth, or even a toothless edge coated with a layer of tungsten carbide grit, a patient user could apply the thus adapted tool to cleanly cut through much harder objects like steel bars or pipes, e.g., right where they are projecting from a wall or a concrete floor.

20 Claims, 6 Drawing Sheets

TOOL FOR CUTTING TOUGH ELEMENTS

FIELD OF THE INVENTION

This invention relates to a small, inexpensive, manual tool for cutting tough elongate elements in awkward places. More particularly, one embodiment of the invention relates to a small, hand-held, garden tool with which a user can quickly and easily cut woody stems and the like, at or a little below ground level, e.g., to neatly clear a garden area of unwanted vegetation such as brush and mature weeds without having to uproot them. With appropriate choice of a cutting blade in the tool, and a little patience, a user can adapt the same tool to cleanly cut much tougher elongate elements like metal bars or pipes, very close to where they project from walls or are embedded in concrete, e.g., after a natural disaster or fire.

BACKGROUND OF THE RELATED ART

Gardeners, real estate developers, and groundskeepers in general, often encounter tough woody stems and mature weeds that are very hard to cut down so close to the ground that they do not leave unsightly and potentially dangerous stubs sticking out to trip the unwary. Persons facing this task often use strong shears, or struggle with either a hand saw or a power saw, to do what they can.

Manual shears capable of cutting woody stems up to an inch across require considerable strength and dexterity to use effectively, they are heavy to lug around over rough or hilly terrain, and tend to be expensive—posing a serious problem if they are stolen from a work site while the user is otherwise occupied or distracted. A conventional hand-held saw, flat-bladed or in a frame, is very inconvenient to use at ground level. A power saw or trimmer, because it typically has a bulky motor housing, is likewise hard to use to effect cuts close to ground. Furthermore, an electrical device requires a power supply and poses safety challenges if the ground is wet or when it is likely to rain. A gasoline-powered trimmer, chain-saw, or the like is equally unwieldy and risky to use at ground level, especially if the ground is wet and muddy. Since groundskeepers, gardeners, and landscape workers generally cannot expect much sympathy from their employers about such issues they often have to struggle to do the clearing correctly.

On occasion, e.g., after a hurricane or fire, a rescue worker or arson investigator on damaged property might encounter twisted metal in a damaged structure. Even under such trying circumstances, this invention allows untrained and not particularly strong individuals, willing to exercise a little patience and a suitable blade, to adapt the tool to cut very tough elongate items like steel bars and metal pipes very close to where they project out of concrete floors or walls without leaving obtruding and potentially dangerous stubs.

The present invention is small but highly versatile, can be quickly adapted for use in emergencies, under difficult conditions and in tight quarters, and addresses these and other related needs inexpensively, effectively and easily.

SUMMARY OF THE INVENTION

It is a principal object of this invention to provide a lightweight, inexpensive and versatile tool that can be applied even by an untrained user to quickly and cleanly cut through elongate items, e.g., tough woody stems at or just below ground level to clear an area of weeds and unwanted vegetation or metal bars or pipes projecting from a wall or floor after a natural disaster or fire.

This object is realized by providing a hand-held tool having an elongate body attached to a transverse handle at a proximal end and to an open bracket at a distal end that has a concavely open cutting blade secured therein.

It is another related object to provide such a tool with blade-mounting structure at the bracket that allows a user to remove or replace an exhausted cutting blade, or to adapt the tool by mounting to it a specific cutting blade deemed best suited for cutting a particular elongate object.

This object is realized by providing in the bracket either a recess or a groove shaped to closely accommodate a cutting blade, and corresponding means to securely mount a selected cutting blade thereat.

DETAILED DESCRIPTION OF THE PREFERRED EMBODIMENTS

Figure 1:
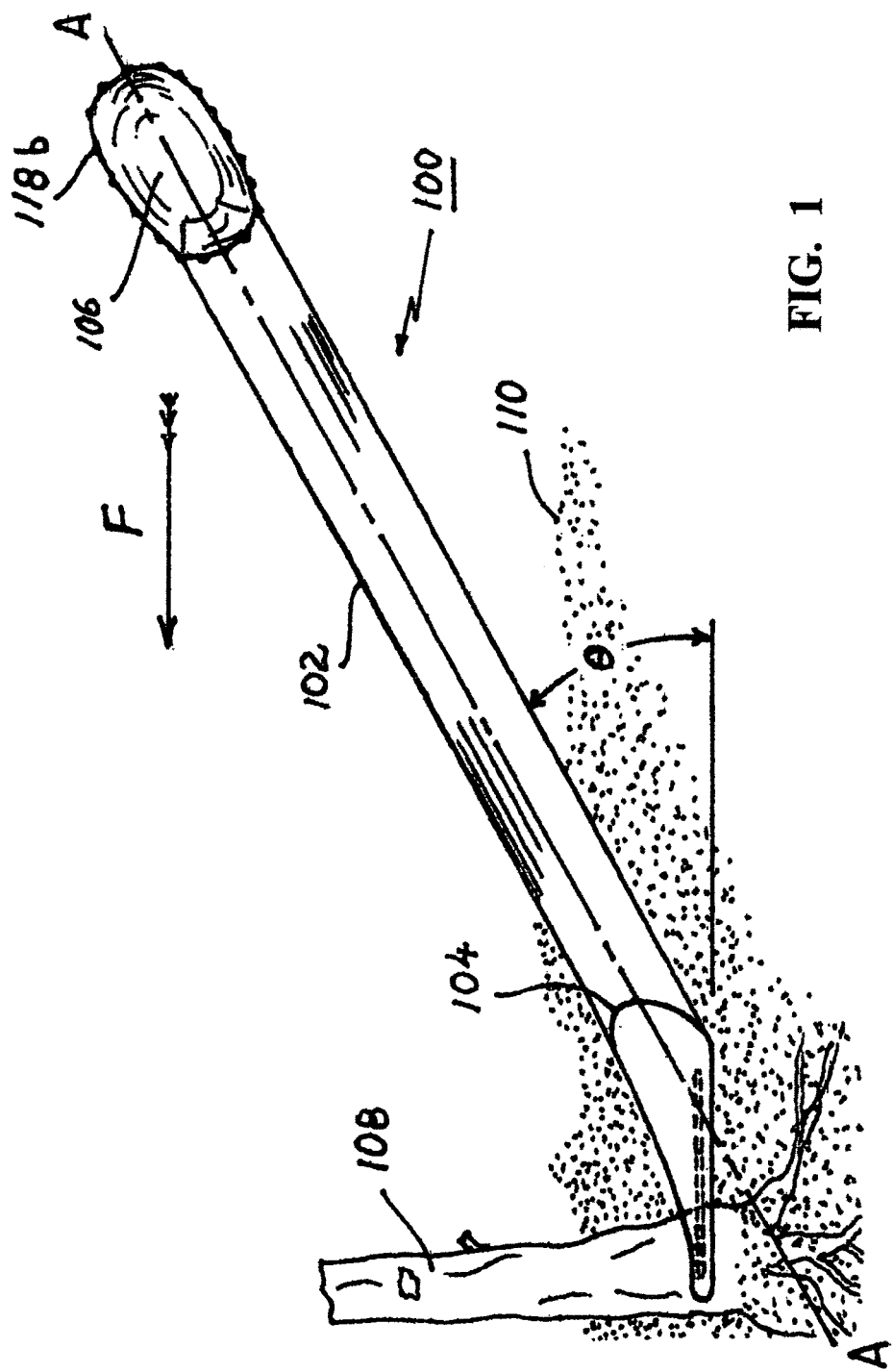
FIG. 1 is a schematic side elevation view of a first embodiment of the invention being applied to cut an upright woody stem a little below surrounding ground level.
Figure 2:
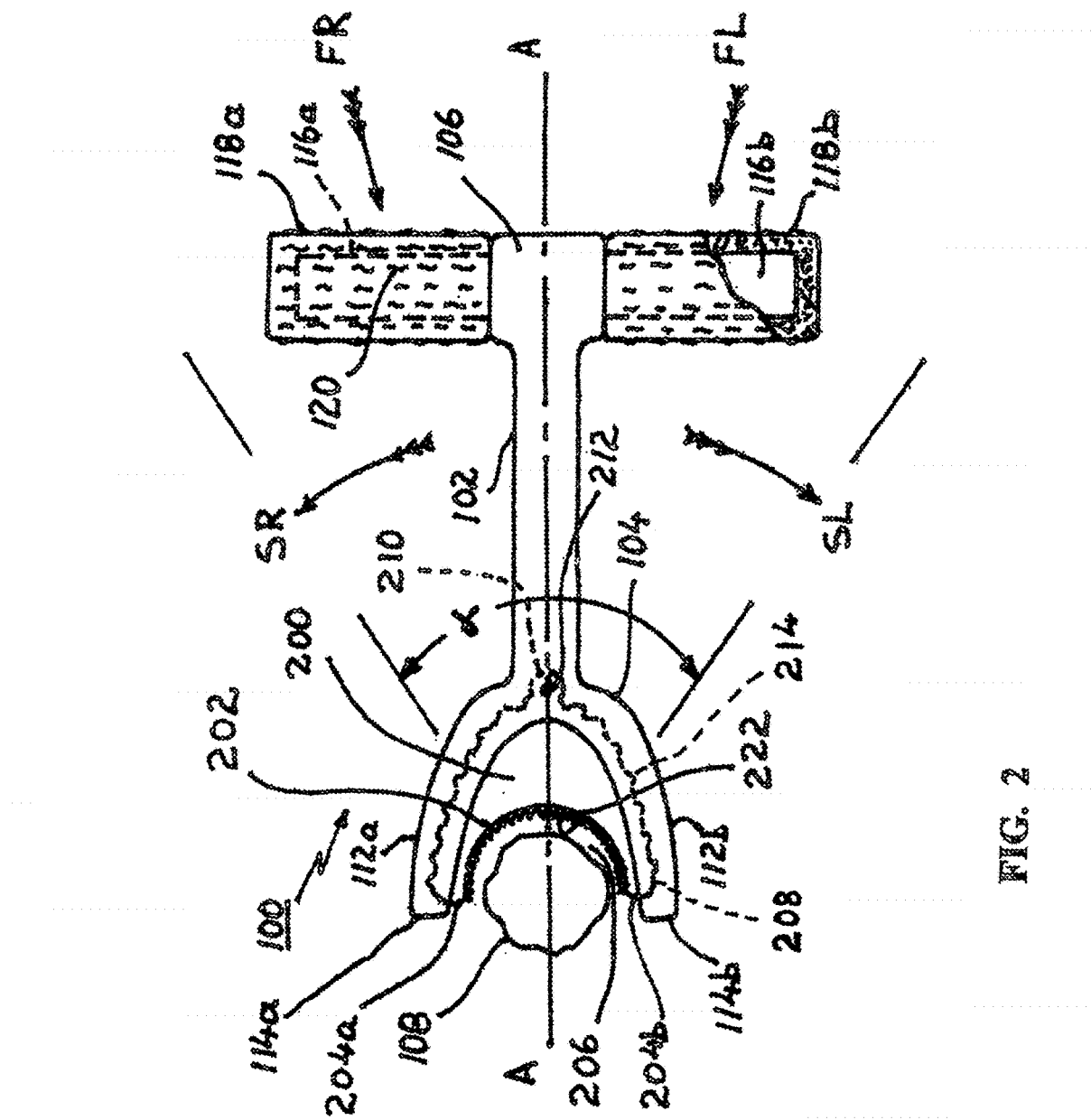
FIG. 2 is a downwardly directed plan view of a shorter version of the tool according to the first embodiment, comprising an exemplary first concavely open, center-symmetric, cutting blade provided with forward-leaning teeth on a semi-circular cutting edge, as applied to cut an upright woody stem.

As best seen in the side elevation and plan views per FIGS. 1 and 2, respectively, a preferred embodiment of this invention has the form of a hand-held tool 100 with an elongate body 102, an open bracket 104 at a front end, and a handle 106 at a rear end.

The tool may be made of a metal, a composite or a strong hard plastics material, to any convenient size, using known manufacturing techniques. A preferred overall length for use as a garden tool is in the range 8-14 in., with a handle width in the range about 7-10 in. Bracket 104 preferably has both a width and a depth in the range 2-3 in. These are merely preferred dimensions, and are not intended to be limiting.

A user of tool 100 would hold handle 106 with both hands and apply the bracket end to an elongate object like an upright woody stem 108 of an undesired weed that is to be cut off at or a little below ground level 110 so that no potentially problematic stub is left behind to subsequently trip an unwary person walking past.

As best seen in FIG. 2, in this embodiment handle 106 is straight and has two equal arms 116a, 116b extending perpendicular to body 102. It may suit some users to have the two halves be somewhat inclined to each other (not illustrated for conciseness). Handle arms 116a, 116b may be fitted with respective rubber or plastic sleeves 118a, 118b, preferably with small bumps or ridges 120, to ensure that the user has a non-slip grip even when working in a wet and/or muddy environment.

Bracket 104, preferably inclined at an angle of up to 45 degrees relative to body 102, has two equal branches 112a, 112b, having respective distal ends 114a, 114b, and is formed to be symmetric about longitudinal axis A-A of body 102. It holds a cutting blade 200 that has a concavely open, center-symmetric, cutting edge 202 provided with forward-leaning teeth 222.

The term "concavely open" means that cutting edge 202 is shaped so that its laterally outermost ends 204a, 204b are located apart within symmetric bracket arms 112a, 112b, and during use are disposed forwardly. This provides a path of entry to receive the object 108 (that is to be cut by tool 100) into the middle concave opening 206 thus defined by cutting edge 202.

The term "center-symmetric" is intended to clarify that cutting edge 202 is symmetric about its center. This is to ensure that the cutting action (described below) that will be generated by the user will be of equal effect on both sides of the object being cut.

The term "forward-leaning teeth" means that the teeth are cut so that their leading sharpest cutting points and edges are oriented to cut most effectively when the teeth move forwardly into a work-piece. The teeth on opposite sides of the central axis plane of a center-symmetric cutting blade like 202 will be mirror images of each other Consider, for example, that in using an ordinary hacksaw one places the blade such that its "forward-leaning teeth" do the cutting almost exclusively on the forward stroke. The return stroke with such a hacksaw no doubt does some cutting but that is almost insignificant compared to what the "forward-leaning" teeth do when forced forward onto the work-piece. It should also be understood that, just as with conventional linear or circular "disk" saws, alternate teeth in all toothed saw blades considered suitable in this invention also lean outward on opposite sides of the cutting blade to help clear cut-off particles that otherwise would clog and bind the saw blade in the cut that it is making.

Note that the outer periphery 208 of blade 200, as shown by broken lines in FIG. 2, has a somewhat irregular arcuate profile that includes a central extension 210 with a through aperture 212. One inexpensive technique for mounting blade 200 to the tool is to mold or otherwise integrate it into bracket 104, and in this option the irregularities 214 and extension 210 cooperate to help positively secure blade 200 to bracket arms 112a, 112b. A small screw or locater pin (not identified due to scale) may be placed in aperture 212 to further ensure against separation of blade 200 from bracket 104. Note that the principal force exerted during use is directed forward so that the reaction force from object 108 will tend to push blade 200 backward into bracket 104. The expressed concern therefore has to do mainly with occasional impacts on bracket 104 that might generate separation-promoting forces. Tool 100 with its cutting blade 200 integrated into bracket 104 is obviously going to be somewhat limited in the objects it can be used to cut.

To make the tool more versatile by being able to exchange blades for different cutting tasks it is necessary to make the bracket structure a little more sophisticated. Factors to be considered include alternative shapes for the blade element, optional cutting edge structures for cutting materials of different hardness, and alternative ways of securing a blade to the tool bracket. The numerous permutations of such features allow for creative combinations to suit a wide array of applications to address different needs. This aspect of the invention makes the tool both highly versatile and easily adaptable for urgent use, and therefore an important addition to many personal tool inventories.

Figure 3:
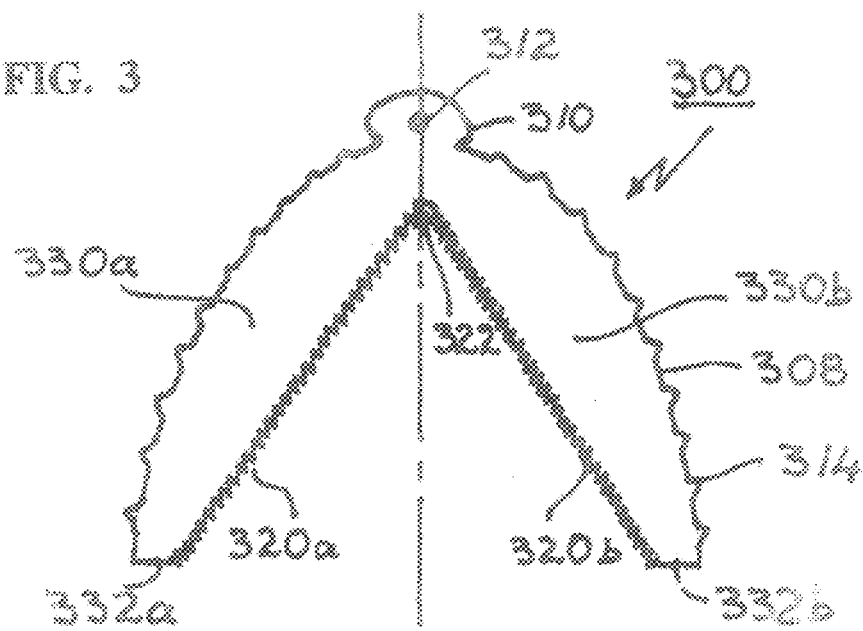
FIG. 3 is a plan view of an exemplary second concavely open, center-symmetric, cutting blade for the tool, comprising a pair of intersecting straight cutting edges each having forward-leaning teeth, wherein the blade has an irregular outer periphery and a single centered aperture.

FIG. 3 is a plan view of a cutting blade 300 that has center-symmetric arms 330a, 330b with respective ends 332a, 332b. It also has an irregular periphery 308 similar to that of cutting blade 200 discussed above, including central extension 310, aperture 312, and a plurality of irregularities 314. Cutting blade 300 has a V-shaped concavely open, center-symmetric, cutting edge comprising a pair of intersecting linear portions 320a, 320b that meet at center 322 which will be located in the vertical plane of longitudinal axis A-A of the tool when cutting blade 300 is mounted for horizontal application in use.

Figure 4:
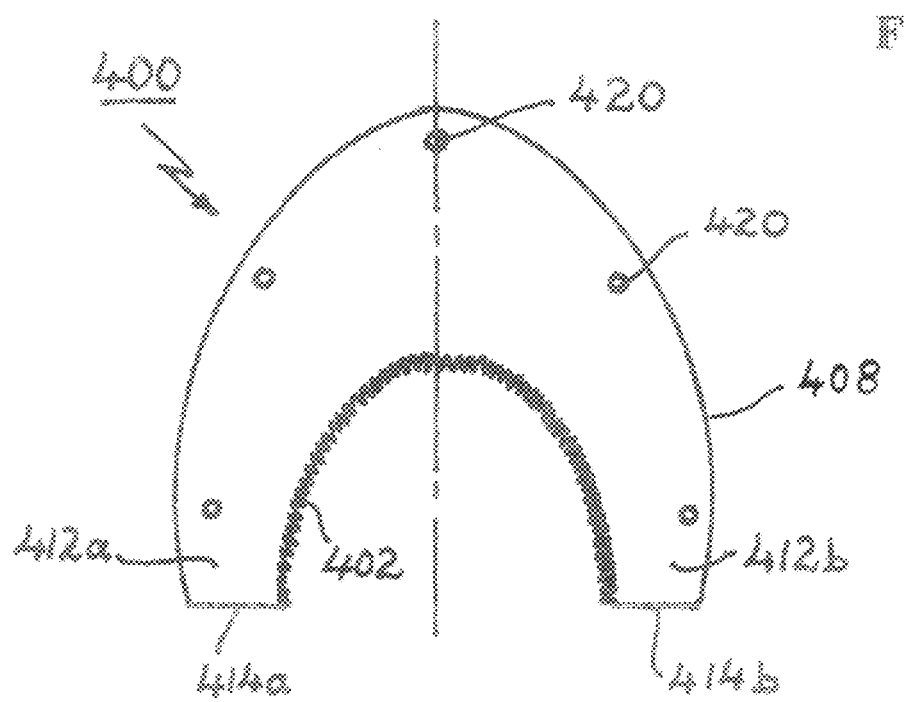
FIG. 4 is a plan view of an exemplary third concavely open, center-symmetric, cutting blade for the tool, comprising a set of forward-leaning teeth on an arcuate cutting edge, wherein the blade has an arcuate outer periphery and a plurality of apertures.

FIG. 4 is a plan view of a cutting blade 400 that has a concavely open, center-symmetric, arcuate cutting edge 402 with a generally parabolic profile (unlike the semicircular profile of cutting edge 202 discussed earlier with reference to FIG. 2). Cutting blade 400 has a pair of arms 412a, 412b with respective ends 414a, 414b, and a smoothly arcuate outer periphery 408. It has a plurality of through apertures 420 distributed inside periphery 408.

Figure 5A:
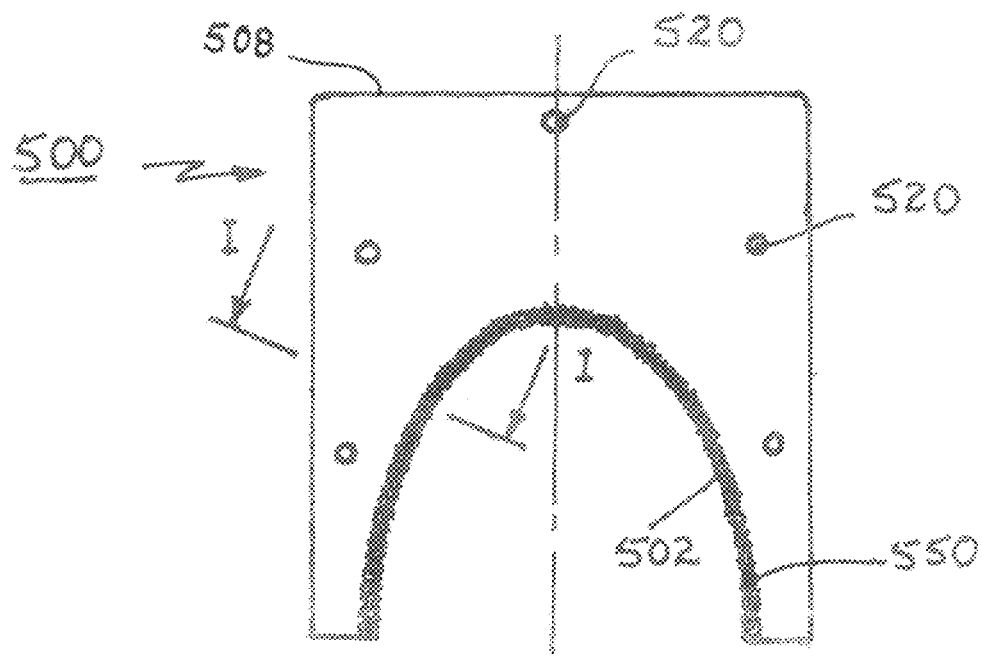
FIG. 5(A) is a plan view of an exemplary fourth concavely open, center-symmetric, cutting blade for the tool, comprising an arcuate cutting edge coated with a cutting grit, wherein the blade has a rectangular periphery and a plurality of apertures.

FIG. 5(A) is a plan view of a cutting blade 500 that differs from cutting blade 400 in having a rectangular outer periphery 508 instead of an arcuate one. It does, however, have an arcuate cutting edge 502. Cutting blade 500 has a plurality of through apertures 520 through which screws are passed to secure it to a matching tool bracket.

Conventional "high carbon" steel saw blades with forward-leaning teeth will cut many commonly encountered materials, e.g., wood, plastics, and some of the softer metals like brass, copper and iron. Toothed cutting blades suitable for use in the present invention may be made of conventional case-hardened steel just like hacksaw blades and the like. However, if a saw of any kind is to be used to cut hard steel, it is advisable to have the saw teeth tipped with tungsten carbide tips that are singularly hard, can be sharpened with a diamond dressing wheel when needed, and are relatively inexpensive but very durable. This choice is recommended for cutting blades to be used in this invention for cutting hard materials.

As previously mentioned, one may occasionally need to cut steel bars in storm or fire-damaged property. Such objects might be exposed from a wall or concrete and have very hard sand and/or cement particles strongly adhered to them. Even a carbide-tipped saw tooth might crack if used with less than extreme care under such circumstances, but a cutting blade coated with a layer of carbide or diamond grit could be used very comfortably to cut through both steel and concrete. Considerations of cost might make diamond grit impractical for some users, but tungsten carbide grit-coated cutting blades are affordable and could be beneficially included in a set of cutting blades owned by most users of this invention. Their use may require some patience, but as indicated in FIGS. 5(A) and 5(B), such cutting blades are a viable option under special circumstances.

Figure 5B:
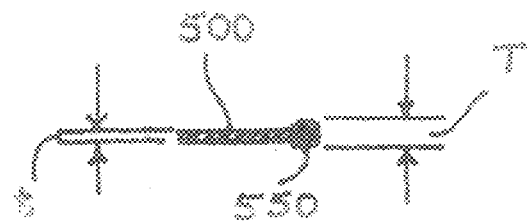
FIG. 5(B) is a cross-sectional view through the same cutting blade at Section I-I.

As best seen in FIG. 5(B), such an abrasive grit coating 550 will give the cutting profile a thickness "T" that is a little more than the parent blade thickness "t". This should pose no problem, and in fact will allow particles of cut-off material to slide away without binding the cutting blade during use.

Figure 6A:
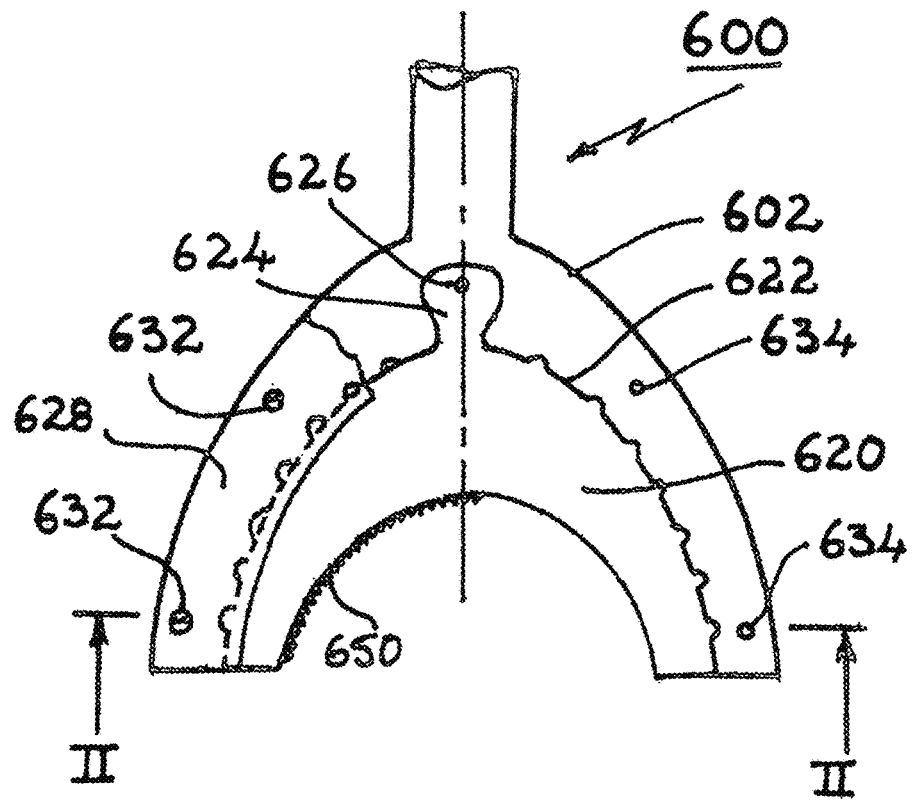
FIG. 6(A) is a schematic plan view of the bracket portion of the tool to explain a structure in which a cutting blade with an irregular arcuate outer periphery is retained within a recess.
Figure 6B:
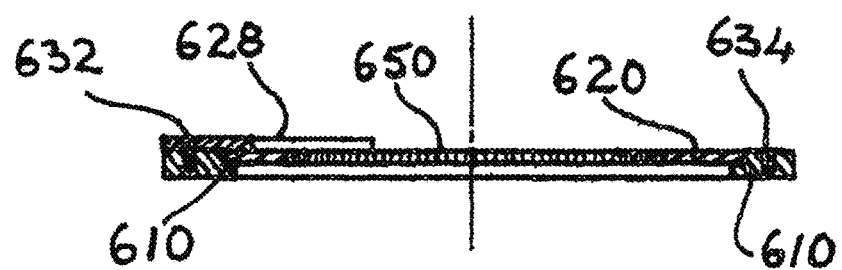
FIG. 6(B) is a cross-sectional view thereof at Section II-II.

There are other alternatives to simply integrating the cutting blade into the bracket part of the tool. One such structure is as shown in FIGS. 6(A) and 6(B). As schematically indicated in FIG. 6(A), in a tool 600 the bracket 602 is formed to have a recess 610 with a periphery that matches in shape and size a corresponding outer periphery 622 of a cutting blade 620 comparable to cutting blade 300 (best seen in FIG. 3). This irregular periphery 622 includes a central extension 624. The thickness of cutting blade 620 should be slightly larger than the depth of recess 610. Cutting blade 620 has an aperture 626 through central extension 624.

A blade-retaining cover 628 has an outer periphery that matches that of bracket 602, and extends inwardly to definitely cover and extend inwardly over the irregular periphery of cutting blade 620. Blade-retaining cover 628 is provided with a plurality of through apertures 630. A number of small screws 632 are tightened through apertures 630 into corresponding threaded holes 634 provided to receive them in bracket 602 beneath cutting blade 620. When the screws are tightened in place, cutting blade 620 is securely connected to bracket 600 by the force exerted by screwed-down retaining cover 628 and the close fit between the irregular outer periphery of cutting blade 620 and the matching periphery of recess 610. Concavely open, center-symmetric cutting edge 650 (shown equipped with forward-leaning teeth) now becomes available to cut an object that it is applied to as described above.

Figure 7A:
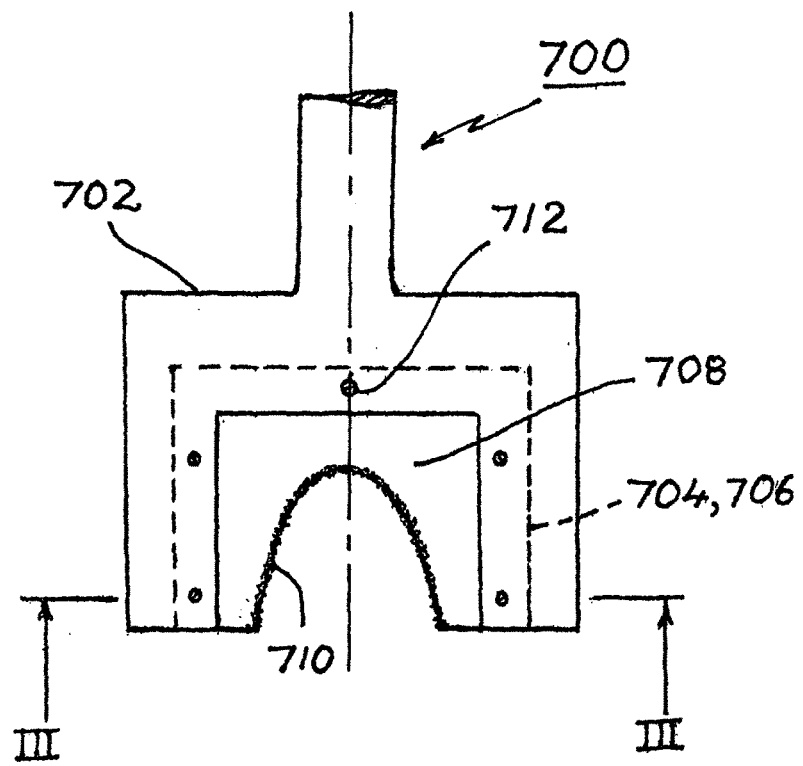
FIG. 7(A) is a plan view of the bracket portion of the tool to explain a structure in which a cutting blade with a rectangular periphery is retained within a groove.
Figure 7B:
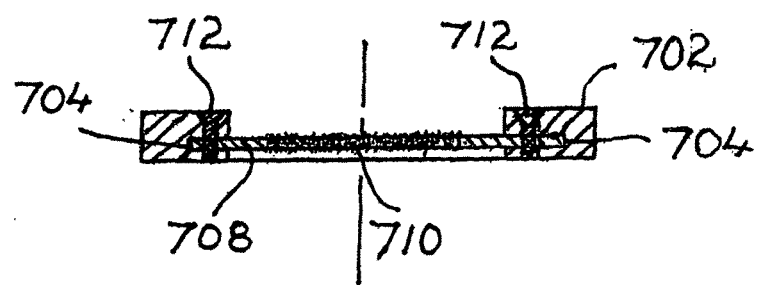
FIG. 7(B) is a cross-sectional view thereof at Section III-III.

In yet another alternative structure, a tool 700 has a bracket 702 provided with a peripheral interior groove 704 shaped and sized to very closely fit to the outer periphery 706 of a rectangular cutting blade 708 that has a plurality of through apertures. The selected blade 708 is shown in FIGS. 7(A) and 7(B) in plan and cross-sectional views, respectively, as having a grit-coated cutting edge 710 that has an arcuate profile. Screws 712 are applied to pass through corresponding apertures formed in cutting blade 708 and then threaded and tightened into threaded holes provided in bracket 702 underneath. Cutting blade 708 will experience only a strong forward force principally along central axis A-A, so neither screws 712 nor the arms of bracket 702 should be seriously stressed; and they should securely retain cutting blade 708 in bracket 702 until the user decides to remove and/or replace it.

It should be clear that a manufacturer can make cutting blades in a number of ways to fit a particular bracket and also that the blades can be selectively installed to perform different cutting tasks as and when the user wishes. Such tool and blades sets can be sold as modular kits. In the alternative, a user can simply buy the basic tool and then separately buy and install cutting blades to it to perform specific tasks as needed.

The tool is used as follows, regardless of the cutting blade chosen by the user:

Step 1: select and install a suitable cutting blade in the tool, as appropriate for a given task. Obviously, if a suitable blade is already permanently affixed to the tool then it should be used, otherwise a tool with the appropriate blade should be chosen.

Step 2: apply the cutting edge to the elongate object that is to be cut, by firmly pressing it forward where the cut is to be made, as indicated by arrow "F" in FIG. 1. If it is an upright object then the cutting blade should be held horizontal; in general it should be approximately normal to a longitudinal direction of the object where the cut is to be made.

Step 3: continue to press forwardly on the object with both hands on handle 106 as indicated by arrows "FR" (force with right hand) and "FL" (force with left hand), while simultaneously applying a to-and-fro force comprising alternating force components "SR" (sideways right) and "SL" (sideways left) to cause the tool to oscillate through an angle θ preferably about 90 degrees total around the object being cut. This will cause forced engagement by the forward-leaning teeth of the cutting blade into the material of the object being cut—first on one side of the object and then on the other. The result will be a series of cutting actions into the object principally from two sides. This will be true whether the cutting edge has teeth or abrasive grit doing the actual cutting.

Note that once the cut has advanced a little, the bottom surface of the cutting blade will be supported and guided by the base of the advancing cut in the object being cut, and this should facilitate faster cutting movements by the user.

The selected cutting blade should be large enough to allow a cut to be made through the entire thickness of the object where it is being cut. Even if this is not fully realizable, i.e., a cut through the entire thickness of the object is not possible with a particular cutting blade, making the cut through a substantial portion of the object may weaken the remaining portion enough to allow the user to break it off.

As indicated in FIGS. 1 and 2, if a woody stem is to be safely removed it may be appropriate to remove some dirt from immediately around the stem and then make the cut about an inch or more below the surrounding ground level. Dirt can be restored after the stem is cut off, and no unsightly and dangerous stub will then be left to trip unwary persons passing by.

If the tool is used to cut off metal bars or pipes projecting from a wall or cement floor, a suitable cutting blade must be installed and the cutting done patiently with the bottom of the bracket held close to the wall or floor as the case may be. The cut will remove the offending object, and a barely noticeable remnant of the object will be left and this, hopefully, will not pose a continuing problem.

It should be obvious that the handle can be formed to be in line with the longitudinal axis of the tool body instead of being made transverse to it. Such a variation of the tool may be useful for some applications, with the user holding the elongate handle with both hands, pressing towards the cutting edge being applied to an object, and rocking the tool about the object generally as described earlier to effect a cut.

The tool according to this invention in its various embodiments is so compact and light that a competent user should be able to apply it even in awkward and confined spaces as may be necessary in the aftermath of a storm or fire. A practiced user, e.g., a fire fighter or rescue worker, may thus find this invention valuable enough to carry along on most missions.

Naturally, care must be taken by prison authorities to keep the tool out of the hands of captives who might be tempted to use it to cut through prison bars and escape.

Persons of ordinary skill in the mechanical arts will no doubt find benefit in forming various combinations of the different disclosed aspects of this invention to meet particular needs. All such modifications of the disclosed invention are intended to be comprehended in and limited solely by the claims appended below.

The invention claimed is:

1. A method of manually cutting a tough elongate object, comprising the steps of:
    (a) providing a hand-held tool with an open bracket at a front end and a handle at a rear end, and mounted to the bracket a blade that has a concavely open edge profile and means for cutting disposed along said edge profile for cutting the object;
    (b) applying the cutting means to the object where the object is to be cut; and
    (c) simultaneously applying to the edge profile with both hands, by means of the handle, a force component directed toward the object and alternating force components directed around the object to thereby cut the object by alternately traversing the cutting means forcefully on different sides thereof.

2. The method according to claim 1, comprising the further step of:
    (d) selecting a blade sized and shaped to fully accommodate the object within the concave opening of the edge profile during step (c).

3. The method according to claim 1, wherein:
    the selected cutting means consists of center-symmetric, forward-leaning teeth.

4. The method according to claim 1, wherein:
    the cutting means consists of a coating that includes a hard cutting grit.

5. A manually operable cutting tool suitable for cutting a tough elongate woody stem or metal bar, comprising:
    an elongate body having first and second ends, with a handle at the first end and an open bracket at the second end;
    a blade mounted to the open bracket, with a center-symmetric, concavely open cutting edge profile defining only a single opening sized to receive an object where it is to be cut; and
    means for cutting the object, disposed along the cutting edge profile, for cutting the object by a series of alternating cutting actions into two sides of the object when the tool is applied to the object with a force component directed toward the object accompanied by simultaneous alternating sideways force components applied in a to-and-fro oscillating motion around the object,
        wherein said cutting means comprises a plurality of sharp edges and cutting points.

6. The tool according to claim 5, wherein:
    the handle is oriented generally transversely to the body and is configured to provide a user a secure two-handed grip with one hand on each side of the body for simultaneous application of the force component directed toward the object and the alternating sideways force components to cut the object.

7. The tool according to claim 5, wherein:
    the blade is flat, so that the cutting means will effect a flat cut along the plane of the blade.

8. The tool according to claim 7, wherein:
    the bracket holds the blade inclined at a predetermined angle ranging from 0 to about 45 degrees relative to a longitudinal axis of the body.

9. The tool according to claim 5, wherein:
    the blade has a substantially V-shaped cutting edge profile comprising two intersecting straight edge portions; and
    the cutting means consists of forward-leaning teeth disposed on the straight edge portions to effect the cutting.

10. The tool according to claim 9, wherein:
    the teeth are provided with tungsten carbide tips.

11. The tool according to claim 5, wherein:
    the cutting means consists of forward-leaning teeth on both sides of the profile center to effect the cutting.

12. The tool according to claim 11, wherein:
    the teeth are provided with tungsten carbide tips.

13. The tool according to claim 5, wherein:
    the cutting means consists of a layer of an abrasive grit to effect cutting.

14. The tool according to claim 13, wherein:
    the abrasive grit comprises tungsten carbide.

15. The tool according to claim 5, wherein:
    the blade is permanently bonded to the tool.

16. The tool according to claim 5, wherein:
    the bracket is formed to have a shallow recess shaped and sized to closely accommodate the blade,
    the tool further comprising
    mounting means cooperating with the bracket and the blade to detachably but securely mount the blade to the tool inside the recess.

17. The tool according to claim 16, wherein:
    the cutting edge has an irregular outer periphery and at least one aperture;
    the recess has an inner periphery that closely accommodates the outer periphery of the blade; and
    the mounting means comprises a cover element that has a plurality of apertures and a corresponding plurality of screws passing through the apertures into the bracket, with at least one of the screws passing through the cover element and the at least one aperture in the blade and into the bracket, to thereby secure the cover element and the blade to the tool.

18. The tool according to claim 5, further comprising:
    a groove formed in the bracket to closely accommodate the blade; and
    mounting means cooperating with the bracket and the blade for detachably but securely mounting the blade to the tool inside the groove.

19. The tool according to claim 18, wherein:
    the concavely open blade has a plurality of apertures; and
    the mounting means comprises screws that simultaneously pass through the apertures of the blade and into the bracket.

20. A manually operable cutting tool kit, comprising:
    at least one tool handle and at least one blade according to claim 5; and
    at least one additional blade, each of the at least one blade and the additional blade being provided with a respective one of said cutting means, so that a user may use from the kit that blade which is most suitable for cutting the object.

* * * * *